United States Patent
Yao et al.

(10) Patent No.: US 12,398,057 B2
(45) Date of Patent: Aug. 26, 2025

(54) SYSTEM AND METHOD FOR EFFICIENT NITROGEN AND CARBON REMOVAL AND PHOSPHORUS RECOVERY OF SOURCE-SEPARATED FRESH URINE BY BIOCHEMICAL COMBINATION

(71) Applicant: BEIJING JIAOTONG UNIVERSITY, Beijing (CN)

(72) Inventors: Hong Yao, Beijing (CN); Ning Mei, Beijing (CN); Fangxu Jia, Beijing (CN); Xiangyu Han, Beijing (CN); Zhifeng Hu, Beijing (CN); Baohong Han, Beijing (CN); Xingcheng Zhao, Beijing (CN); Tianyi Yang, Beijing (CN)

(73) Assignee: BEIJING JIAOTONG UNIVERSITY, Beijing (CN)

(*) Notice: Subject to any disclaimer, the term of this patent is extended or adjusted under 35 U.S.C. 154(b) by 393 days.

(21) Appl. No.: 18/194,853

(22) Filed: Apr. 3, 2023

(65) Prior Publication Data

US 2023/0312382 A1    Oct. 5, 2023

(30) Foreign Application Priority Data

Apr. 2, 2022    (CN) .......................... 202210341405.6

(51) Int. Cl.
*C02F 3/30* (2023.01)
*C02F 1/52* (2023.01)
(Continued)

(52) U.S. Cl.
CPC ............ *C02F 3/308* (2013.01); *C02F 1/5236* (2013.01); *C02F 3/12* (2013.01); *C02F 3/305* (2013.01);
(Continued)

(58) Field of Classification Search
CPC .......... C02F 3/308; C02F 1/5236; C02F 3/12; C02F 3/305; C02F 2101/105;
(Continued)

(56) References Cited

U.S. PATENT DOCUMENTS 10,093,568 B2 *   10/2018   Chen ...................... C02F 3/308

FOREIGN PATENT DOCUMENTS

CN     101439915 B    * 12/2010    ................ C02F 9/14
CN     111606419 A    *  9/2020    ................ C02F 3/34
(Continued)

OTHER PUBLICATIONS

Translation of Yalei (CN101439915B) (Year: 2010).*
(Continued)

*Primary Examiner* — Ekandra S. Miller-Cruz

(57) ABSTRACT

Disclosed are a system and method for efficient nitrogen and carbon removal and phosphorus recovery of source-separated fresh urine by biochemical combination. The system includes a functionally zoned membrane aerated biofilm reactor for in-situ nitrogen and carbon removal, a source separation toilet, a source-separated urine storage tank, a phosphorus recovery reactor, a calcium salt solution tank, a water production tank, and a control system. The membrane aerated biofilm reactor is divided into an upper part and a lower part, a micro-aerobic environment is formed in the upper part while an anaerobic environment is formed in the lower part, and thus nitrogen and carbon can be removed only in the membrane aerated biofilm reactor. The system disclosed by the present disclosure can achieve the goal of removing nitrogen and carbon by 95% and more without additional carbon source, and can meet the demand of in-situ sewage treatment on a train.

8 Claims, 1 Drawing Sheet

(51) Int. Cl.
  *C02F 3/12* (2023.01)
  *C02F 101/10* (2006.01)
  *C02F 101/16* (2006.01)
  *C02F 103/00* (2006.01)
  *C05B 7/00* (2006.01)

(52) U.S. Cl.
  CPC .......... *C05B 7/00* (2013.01); *C02F 2101/105* (2013.01); *C02F 2101/16* (2013.01); *C02F 2103/005* (2013.01); *C02F 2209/40* (2013.01)

(58) Field of Classification Search
  CPC ............ C02F 2101/16; C02F 2103/005; C02F 2209/40; C02F 3/307; C02F 3/102; C02F 3/302; C02F 9/00; C02F 3/02; C02F 7/00; C05B 7/00; Y02W 10/10
  USPC ....................................................... 210/605
  See application file for complete search history.

(56) References Cited

FOREIGN PATENT DOCUMENTS

| | | | | |
|---|---|---|---|---|
| CN | 214653941 U | * | 11/2021 | ................ C02F 3/30 |
| JP | H1052696 A | * | 2/1998 | ................ C02F 1/52 |

OTHER PUBLICATIONS

Translation of Qi (CN111606419A) (Year: 2020).*
Translation of Sui (CN214653941U) (Year: 2021).*
Translation of Kataoka (JPH1052696A) (Year: 1998).*

* cited by examiner

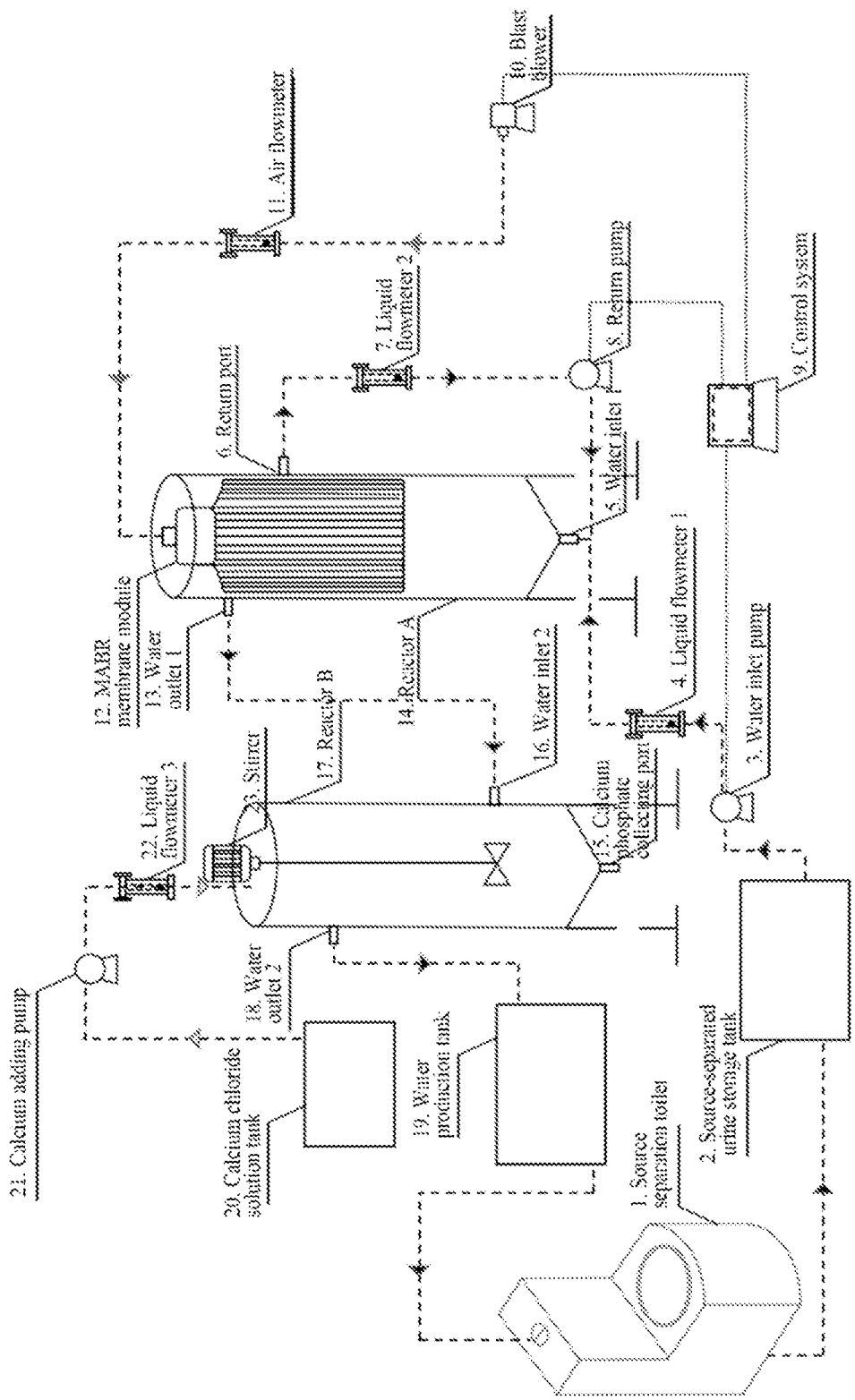

SYSTEM AND METHOD FOR EFFICIENT NITROGEN AND CARBON REMOVAL AND PHOSPHORUS RECOVERY OF SOURCE-SEPARATED FRESH URINE BY BIOCHEMICAL COMBINATION

CROSS-REFERENCE TO RELATED APPLICATION

This patent application claims the benefit and priority of Chinese Patent Application No. 202210341405.6, filed with the China National Intellectual Property Administration on Apr. 2, 2022, the disclosure of which is incorporated by reference herein in its entirety as part of the present application.

TECHNICAL FIELD

The present disclosure belongs to the field of environmental protection, and in particular to a system and method for efficient nitrogen and carbon removal and phosphorous recovery of source-separated fresh urine by biochemical combination.

BACKGROUND

The existing train toilet is only used as a sewage receiving unit, and does not have any sewage in-situ treatment function. Moreover, due to large quality and quantity fluctuation and high pollutant concentration of the sewage in the train toilet, it is difficult to treat by using the existing treatment method, and the problems of pollutant residue and biological safety cannot be effectively solved. In addition, in the traditional drainage system, fecal sewage is mixed with other sewage, resulting in more water consumption, and pathogens and micro-pollutants in the water have the possibility of diffusion. Therefore, separated collection of manure and urine from the source can significantly reduce the pollution load of domestic sewage, and reduce the treatment difficulty of sewage treatment plants, and reduce the risk of water pollution caused by pollutant discharge. The research shows that the average urine output per person per day is 1.5 L, which only accounts for 2% of the per capita domestic sewage discharge, but contributes 90% of nitrogen, 50% of phosphorus and 10% of COD in the domestic sewage. Therefore, source separation of manure from urine has become an environmental protection trend. In addition, the treatment of source-separated fresh urine has obvious advantages over source-separated hydrolyzed urine. On the one hand, for the source-separated urine that requires in-situ treatment in the train, the addition of a storage device for urea hydrolysis increases not only the construction cost, but also the space burden. On the other hand, the hydrolyzed urine may produce irritating odor due to the volatilization of ammonia, resulting in adverse effects on the outside world, and the addition of odor removal treatment also increase the operating cost. Therefore, it is of far-reaching significance to efficiently treat source-separated fresh urine. After nitrogen and carbon removal and phosphorous recovery of the source-separated fresh urine, the treated water can be used for flushing the toilet, which not only saves water resources, but also recovers valuable resources such as phosphorus, thus achieving energy recycling.

In the prior art 1: A yellow water resource treatment technology is mentioned in the doctoral thesis "Combined treatment processes of yellow water: aiming to recover phosphorus and potassium", in which a nitritation/anammox method is mentioned, and the SBR (sequence batch reactor) is used as a carrier for nitrogen removal. It is found that the ammonium removal rate of the yellow water treated by the method reached 90% and more. It is also pointed out that the pretreatment of organic matter removal can eliminate the potential influence of organic matters on nitrogen removal due to the high proportion of organic matters in yellow water.

In the prior art 2: A process method suitable for low-carbon nitrogen ratio sewage treatment is disclosed in CN113845224A, in which a process method suitable for low-carbon nitrogen ratio sewage treatment is mentioned. By establishing a partial short-cut nitritation/ANAMMOX membrane aerated biofilm reactor (PN/A MABR), the synergistic nitrogen removal performance of key functional bacteria in the MABR biofilm is improved. The process method has the advantages of low energy consumption and low sludge output, and can replace some functions of an aerobic tank, an anoxic tank and an anaerobic tank in the conventional biological nitrogen removal process, and reduce the number and area of structures.

In the prior art 3: A recovery device for high-purity nitrogen and phosphorus recovery of source-separated urine, and a recovery method and application thereof are disclosed in CN113184818A. It is mentioned that researchers have developed many technologies to achieve the separation and recovery of nitrogen and phosphorus in the source-separated urine, the most widely used method is chemical precipitation, slow-release fertilizers containing nitrogen phosphorus are reduced, such as struvite ($MgNH_4PO_4 \cdot 6H_2O$) and hydroxyapatite [$Ca_5(PO_4)_3OH$]. At the same time, the problems existing in the prior art are mentioned, that is, not only are additional chemicals (e.g., a magnesium source, a calcium source or alkali) required to provide the best precipitation conditions, resulting in an increase in the overall cost, but also high-concentration coexisting ions (e.g., $HCO^{3-}$, $Na^+$, $K^+$ and $Ca^{2+}$) may induce the generation of unexpected mineral composition in the source-separated urine, resulting in great reduction of the quality of the obtained nitrogen phosphorus products.

However, the methods in the prior art cannot meet the requirements of recovering, treating and recycling the source-separated urine in-situ.

SUMMARY

To solve the problem above, the present disclosure provides a system and method for efficient nitrogen and carbon removal and phosphorous recovery of source-separated fresh urine by biochemical combination. The system is small in volume and high in treatment efficiency, and after in-situ treatment, the obtained sewage can be recycled without additional carbon source.

In one aspect of the present disclosure, a functionally zoned membrane aerated biofilm reactor (MABR) for in-situ nitrogen and carbon removal is provided. The membrane aerated biofilm reactor includes a vertically arranged tank body. The tank body includes an upper part and a lower part therein; the upper part is provided with a MABR membrane module, and the lower part is a space communicating with the upper part. The tank body is provided with a first water inlet, a first water outlet and a return port. The first water inlet is provided at the bottom of the functionally zoned membrane aerated biofilm reactor, the first water outlet is provided at the upper part of the functionally zoned membrane aerated biofilm reactor and is not lower than the MABR membrane module; and the return port is also provided on the functionally zoned membrane aerated biofilm reactor and is connected to the first water inlet through a return pump. An aerator device for supplying oxygen to the MABR membrane module is provided at the top of the functionally zoned membrane aerated biofilm reactor.

Further, the first water outlet is arranged above the MABR membrane module.

Further, a second liquid flowmeter is further arranged upstream the return pump.

Further, anaerobic bacteria are provided in the lower part of the functionally zoned membrane aerated biofilm reactor, and nitrococcus-anammox double-layer microbes are attached to the MABR membrane module at the upper part of the functionally zoned membrane aerated biofilm reactor.

Further, denitrifying bacteria are further provided in the lower part of the functionally zoned MABR reactor.

Further, the volume of the upper part and the lower part of the functionally zoned MABR reactor is 30-50 L and 20-30 L, respectively.

In another aspect of the present disclosure, a method for nitrogen and carbon removal of source-separated urine is provided. The method includes steps of treating the source-separated urine by using above functionally zoned MABR reactor for in-situ nitrogen and carbon removal.

Further, the method includes the following steps:

S01): injecting source-separated urine into the lower part of the functionally zoned membrane aerated biofilm reactor through a first water inlet, and adjusting, by an aerator device, the dissolved oxygen concentration at the lower part of the membrane aerated biofilm reactor to be zero, thus hydrolyzing urea into ammonia nitrogen under the action of anaerobic bacteria;

S02): after a hydrolysis rate of the urea in the lower part reaches 85% or more in step S01), continuing to inject the urine to be treated through the first water inlet at the bottom, enabling part of the urine to enter the MABR membrane module at the upper part, controlling the dissolved oxygen of the MABR membrane module at the upper part to be 0.3 mg/L to 0.5 mg/L, and removing nitrogen under the action of microbes on the surface of the MABR membrane module at the upper part, thus generating nitrogen and nitrate nitrogen; and S03): returning liquid containing nitrate nitrogen after treatment in the upper part to the lower part of the membrane aerated biofilm reactor by a return pump, and reducing the nitrate nitrogen to nitrogen by denitrification at the lower part.

In still another aspect, a system for efficient nitrogen and carbon removal and phosphorus recovery of source-separated fresh urine is provided. The system includes above functionally zoned membrane aerated biofilm reactor for in-situ nitrogen and carbon removal.

Further, the system also includes a source separation toilet, a source-separated urine storage tank, a phosphorous recovery reactor, a calcium salt solution tank, a water production tank, and a control system.

The source separation toilet is connected to the source-separated urine storage tank by a pipeline, the source-separated urine storage tank is connected to the functionally zoned membrane aerated biofilm reactor by a pipeline, the functionally zoned membrane aerated biofilm reactor is connected to the phosphorous recovery reactor by a pipeline, the phosphorous recovery reactor is connected to the water production tank by a pipeline, the phosphorous recovery reactor is connected to the calcium salt solution tank by a pipeline, and the water production tank is connected to the source separation toilet by a pipeline; and at least one of a valve, a water pump, and a liquid flowmeter is configured between every two connected components.

The flow direction, velocity and aeration amount of the liquid in the pipeline are controlled by the control system.

Further, the phosphorous recovery reactor is provided with a second water inlet, a second outlet, a calcium phosphate collecting port, a stirring device, and a calcium salt adding port. The calcium phosphate collecting port is provided at the bottom of the phosphorous recovery reactor, the second water inlet and the second water outlet are provided on a sidewall of the phosphorous recovery reactor, and the position of the second water inlet is lower than that of the second water outlet.

Further, the calcium salt adding port is provided at the top of the phosphorous recovery reactor.

Further, the calcium salt solution tank is used to control calcium salt solution to be added into the phosphorous recovery reactor through a calcium adding pump and a liquid flowmeter.

Further, the liquid part obtained after the separation of the source separation toilet flows into the source-separated urine storage tank by a pipeline, the water production tank is connected to flush water tank of the source separation toilet by the pipeline.

In yet another aspect of the present disclosure, a method for efficient nitrogen and carbon removal and phosphorus recovery of source-separated fresh urine is provided. The method includes the following steps:

S11) separating generated urine by a source separation toilet, then enabling the urine to enter a source-separated urine storage tank, and injecting the urine into a functionally zoned membrane aerated biofilm reactor for nitrogen and carbon removal treatment according to the required flow rate;

S12) enabling effluent after nitrogen and carbon removal treatment by the functionally zoned membrane aerated biofilm reactor to enter a phosphorous recovery rector, and adding calcium salt solution into the phosphorous recovery rector, where the mass concentration of calcium contained in the calcium salt solution is about three times of the phosphorous concentration in the effluent of the functionally zoned membrane aerated biofilm reactor in step S11), slowly mixing by a stirring device to form hydroxyapatite precipitates; and S13) carrying out sludge discharge on the formed hydroxyapatite precipitates through a calcium phosphate collecting port at the bottom of the phosphorous recovery reactor to recover phosphorous from the urine; enabling supernatant after phosphorous removal to flow into a water production tank and return to a flush water tank of the source separation toilet.

The method for performing nitrogen and carbon removal treatment by the functionally zoned membrane aerated biofilm reactor in step S11) includes the following steps:

S01) injecting source-separated fresh urine into the lower part of the functionally zoned membrane aerated biofilm reactor according to claim 1 or 2 through a first water inlet, and adjusting, by an aerator device, the dissolved oxygen concentration at the lower part of the membrane aerated biofilm reactor to be zero, thus anaerobically hydrolyzing urea into ammonia nitrogen;

S02): after the hydrolysis rate of the urea in the lower part reaches 85% or more in step S01), continuing to inject the fresh urine to be treated through the first water inlet at the bottom, enabling part of the urine to enter the MABR membrane module at the upper part, controlling the dissolved oxygen of the MABR membrane module at the upper part to be 0.3 mg/L to 0.5 mg/L, and removing nitrogen under the action of microbes on the surface of the MABR membrane module at the upper part, thus generating nitrogen and nitrate nitrogen; and S03) returning liquid containing nitrate nitrogen after treatment in the upper part to the lower part of the membrane aerated biofilm reactor by a return pump, and reducing the nitrate nitrogen to nitrogen by denitrification at the lower part.

In step S11) to S13), the reaction temperature is 30+/−1° C., pH is from 7.4 to 8.1, and hydraulic retention time (HRT) is from 5 h to 10 h.

The present disclosure has the beneficial effects that

In accordance with the present system, the MABR membrane module is used by the system for aeration, high oxygen transfer efficiency of the membrane module can reduce the electric power consumed when the aeration amount is increased, and bubble-free aeration conducted by the membrane module can reduce the volatilization of volatile gases in urine, thus reducing the adverse effects on the outside world. By arranging the MABR membrane module at the upper part of the membrane aerated biofilm reactor (reactor A), DO zoning can be achieved, a microaerobic environment can be formed at the upper part of the reactor A while an anaerobic environment can be formed at the lower part of the reactor A. Further, different microbes can form dominant microbes in the upper and lower areas of the reactor A, nitrogen and carbon removal can be realized only in the reactor A, and hydroxyapatite formed in the reactor B can be recovered as a material for producing phosphate fertilizer. In addition, urine after nitrogen and carbon removal and phosphorus recovery can be used for flushing toilets, thus reducing the use of tap water and achieving the recycling of urine.

A treatment system with a smaller size is achieved, and the requirement of treating the source-separated urine in in-situ of the train can be satisfied.

The goal of removing nitrogen and carbon by 95% and more can be achieved without adding additional carbon source.

BRIEF DESCRIPTION OF THE DRAWINGS

FIG. 1 is a schematic diagram of a system for efficient nitrogen and carbon removal and phosphorus recovery of source-separated fresh urine by biochemical combination in accordance with the present disclosure.

In the drawings: 1—source separation toilet; 2—source-separated urine storage tank; 3—water inlet pump; 4—first liquid flowmeter; 5—first water inlet; 6—return port; 7—second liquid flowmeter; 8—return pump; 9—control system; 10—blast blower; 11—air flowmeter; 12—MABR membrane module; 13—first water outlet; 14—reactor A; 15—calcium phosphate collecting port; 16—second water inlet; 17—reactor B; 18—second water outlet; 19—water production tank; 20—calcium chloride solution tank; 21—calcium adding pump; 22—third liquid flowmeter; 23—stirrer.

DETAILED DESCRIPTION OF THE EMBODIMENTS

To make the objectives, features and advantages of the present disclosure more apparently and understandably, the following is the detailed description of specific embodiments of the present disclosure, but cannot to be construed as limiting the scope of the embodiments of the present disclosure.

Embodiment 1

As shown in FIG. 1, a system for efficient nitrogen and carbon removal and phosphorus recovery of source-separated fresh urine by biochemical combination includes a source separation toilet 1, a source-separated urine storage tank 2, a functionally zoned MABR reactor (reactor A) 14, a phosphorous recovery reactor (reactor B) 17, a water production tank 19, and a control system 9.

The functionally zoned MABR reactor (reactor A) 14 is provided with a first water inlet 5, a first water outlet 13, a MABR membrane module 12, a return port 6, and an aerator device. The aerator device includes a blast blower 10 and an air flowmeter 11. The MABR membrane module 12 is arranged at the upper part of the functionally zoned MABR reactor 14, and a space capable of accommodating liquid is provided at the lower part of the functionally zoned MABR reactor 14 for anaerobic hydrolysis of urea. The first water inlet 5 is provided at the bottom of the functionally zoned MABR reactor 14; and the first water outlet is provided at the upper part of the functionally zoned MABR reactor 14 and is not lower than the MABR membrane module 12, preferably, above the MABR membrane module 12. The functionally zoned MABR reactor 14 is further provided with the return port 6, the return port 6 is connected to the first water inlet 5 by a return pump 8, and a second liquid flowmeter 7 is further arranged upstream the return pump 8. The aerator device is used to perform aeration on the MABR membrane module 12 through the top of the functionally zoned MABR reactor.

The phosphorous recovery reactor (reactor B) 17 includes a stirring device and a calcium adding device. The stirring device is a stirrer 23. The calcium adding device includes a calcium chloride solution tank 20, the calcium salt is added into the phosphorous recovery reactor (reactor B) through the calcium adding pump 21 and a third liquid flowmeter 22. The phosphorous recovery reactor (reactor B) is also provided with a second water inlet 16, a second water outlet 18, and a calcium phosphate collecting port 15. The calcium phosphate collecting port 15 is provided at the bottom of the phosphorous recovery reactor (reactor B) 17, the second water inlet 16 is provided at the lower part of the second water outlet; and the calcium salt is added by the calcium adding device from the top of the phosphorus recovery reactor (reactor B) 17.

The liquid part obtained after the separation of the source separation toilet 1 flows into the source-separated urine storage tank 2 by a pipeline, the source-separated urine storage tank 2 is connected to the first water inlet 5 of the functionally zoned MABR reactor (reactor A) 14 through a water input pump 3 and a first liquid flowmeter 4. The first water outlet provided on the functionally zoned MABR reactor (reactor A) 14 is connected to the second water inlet 16 of the phosphorous recovery reactor (reactor B) by a pipeline, the second outlet 18 of the phosphorous recovery reactor (reactor B) is connected to the water production tank 19 by a pipeline, and the water production tank 19 is connected to the source separation toilet 1 by a pipeline.

The control system 9 is configured to control on and off of aeration and the amount of aeration by controlling the blast blower 10, opening and closing of return and return flow rate by controlling the return pump 8, opening and closing of calcium addition and the dosage of calcium addition by controlling the calcium addition pump 21, and opening and closing of stirring and the stirring speed by controlling the stirrer. The flow direction and flow velocity of the liquid in the pipeline water inlet pump 3 are controlled by controlling the water inlet pump 3.

In some specific embodiments, a water pump is provided between the source separation toilet 1 and the source-separated urine storage tank 2, between the first water outlet 13 and the second water inlet 16, between the second water outlet 18 and the water production tank 19, and/or between the water production tank 19 and the source separation toilet 1, respectively. The water pumps can be respectively controlled by the control system 9.

The present disclosure is designed aiming at the fact that the existing train toilet only serves as a sewage receiving unit and does not have any sewage in-situ treatment function. The system designed by the present disclosure can achieve in-situ sewage treatment and recovery in the compact space of a train, aiming at the characteristics of sewage in the train toilet, e.g., large fluctuation of water quality and quantity, high concentration of pollutants, and difficulty in satisfying high-standard discharge requirements by the existing treatment methods. After detection, the effluent quality after the treatment of the method for efficient nitrogen and carbon removal and phosphorus recovery of source-separated fresh urine by biochemical combination provided by the present disclosure meets the discharge limit A of Discharge standard of pollutants for municipal wastewater treatment plant (GB18918-2002).

TABLE 1

| Parameter setting | Influent concentration (mg/L) | Effluent concentration (mg/L) | Removal rate % |
| --- | --- | --- | --- |
| Temperature: 30 +/− 1° C. | Chemical oxygen demand (COD) = 200-1000 | ≤20 | ≥90 |
| pH: 7.4-8.1 | | | |
| Hydraulic retention time (HRT) = 5-10 h | Urea = 400-3000 | ≤5 | ≥98 |
| | Total nitrogen (TN) = 200-1500 | ≤10 | ≥95 |
| | Total phosphorous (TP) = 30-200 | ≤0.2 | ≥99 |

As shown in FIG. 1, in the system and method for efficient nitrogen and carbon removal and phosphorus recovery of source-separated fresh urine by biochemical combination, the source separation toilet 1 is used to separate mature from urine from the source, so as to achieve independent storage and treatment. The source-separated urine storage tank 2 is used to store the source-separated urine, so as to provide sufficient influent for a treatment device. The lower part of the functionally zoned MABR reactor (reactor A) is in an anaerobic environment, where urea hydrolysis is achieved, and remove COD in the urine and nitrate nitrogen generated at the upper part can be removed by denitrification. The upper part of the functionally zoned MABR reactor (reactor A) obtains a micro-aerobic environment through bubble-free aeration, where nitrogen removal is achieved through integrated PN/A, and a small amount of generated nitrate nitrogen returns to the lower part of the reactor through the return pump, and is subjected to deep nitrogen removal by denitrification. The phosphorus recovery reactor (reactor B) is a device for performing phosphorus recovery on the source-separated urine after nitrogen and carbon removal by adding calcium chloride solution. The effluent after nitrogen and carbon removal and phosphorus recovery by the reactor A and reactor B is stored in the water production tank for flushing the source separation toilet.

In the system and method for efficient nitrogen and carbon removal and phosphorus recovery of source-separated fresh urine by biochemical combination, through bubble-free aeration of the MABR, the reactor A has high oxygen transfer efficiency, low power consumption, and small influence on the volatile substances in the water. The hydroxyapatite generated in the reactor B can serve as a raw material for producing phosphorus fertilizer, and the effluent after the treatment of the system can be used for flushing the toilet, thus reducing the use of tap water.

In order to achieve in-situ treatment of sewage in the limited space of a train and the recycling of the treated water, the volume of the reactor A is set to be 30 L, the volume of the reactor B is set to be 20 L, the source-separated urine storage tank is 50 L, and the water production tank is 100 L.

On the premise of not adding additional organic matter, the device achieves the effect of treating yellow water in situ, the urea removal ratio reaches 98% or more, and the treated water can reach the degree of returning to flush the toilet. The whole device is small in size and can be used on the train.

In the system and method for efficient nitrogen and carbon removal and phosphorus recovery of source-separated fresh urine by biochemical combination, the return pump, the water pump and the aeration facility are automatically controlled.

Embodiment 3

As shown in FIG. 1 a method for efficient nitrogen and carbon removal and phosphorus recovery of source-separated fresh urine by biochemical combination includes the following steps:

Step 1: Generated urine enters a source-separated urine storage tank after being separated by a source separation toilet, and then flows into the lower part of a reactor A through a water inlet pump according to a required flow rate.

Step 2: After the fresh urine enters the lower part of the reactor A in an anaerobic environment, urea contained in the urine is hydrolyzed into ammonia nitrogen by microbes, the produced ammonia nitrogen is further subjected to an integrated partial nitritation/anammox (PN/A) reaction through the MABR membrane module at the upper part of the aerobic reactor A to generate nitrogen and partial nitrate nitrogen.

Step 3: The nitrate nitrogen generated at the upper part of the reactor A enters the lower part of the reactor A through a return pump, and the denitrifying bacteria at the lower part reduce nitrate nitrogen to nitrogen by using organic matters in the urine, so as to achieve carbon removal and deep nitrogen removal.

Step 4: Effluent after nitrogen and carbon removal treatment by the reactor A enters a reactor B, and calcium chloride solution is added into the reactor B at the same time, where the mass concentration of the calcium contained in the calcium chloride is about three times of the phosphorous concentration in the effluent of the reactor A, and hydroxyapatite precipitates are formed under the slow mixing of a stirrer.

Step 5: The formed hydroxyapatite precipitates are subjected to sludge discharge at the lower part of the reactor B, thus achieving the phosphorous recovery of the urine, the supernatant after phosphorous removal in the reactor B enters the water production tank and is used for flushing the source separation toilet.

In step 1, the urine is discharged to the source separation toilet and is flushed by about 0.5 L clean water in the water production tank, and then enters the source-separated urine storage tank. Then, the flow rate of the water inlet pump is controlled according to the hydraulic retention time (HRT) of the reactor A, and the HRT is from 6 h to 10 h.

In step 2, by adjusting the air flow rate of the MABR at the upper part of the reactor A, the dissolved oxygen (DO) at the upper part is controlled to be 0.3 mg/L to 0.5 mg/L, while the Do at the lower part is zero. The hydrolysis rate of urea in the fresh urine by the anaerobic bacteria at the lower part is 85% or more, and the rest urea enters an aerobiotic MABR region to be further hydrolyzed into ammonia nitrogen by the microbes. The ammonia nitrogen produced by urea hydrolysis in the two regions is treated by integrated PN/A microbes attached to the MABR membrane module to produce nitrogen and partial nitrate nitrogen, the removal rate of ammonia nitrogen in this region is over 90%, and the nitrate nitrogen produced by integrated PN/A is about 11% of the amount of removal of ammonia nitrogen.

In step 3, the nitrate nitrogen produced by the integrated PN/A at the upper part of the reactor A returns to the lower part of the reactor A through the return pump, and the liquid flowmeter is regulated according to the nitrate nitrogen removal condition so as to control the return flow rate, and in this region, denitrifying bacteria takes COD in the urine as an organic carbon source to reduce nitrate nitrogen to nitrogen by denitrification. In this region, the nitrate nitrogen removal rate is 85% or more, while the COD removal rate is 90% or more under the synergetic effect of denitrifying bacteria and other anaerobic heterotrophic bacteria, thus achieving carbon removal and deep nitrogen removal at the lower part of the reactor A.

In step 4, the urine after the nitrogen and carbon removal treatment by the reactor A enters the reactor B through the water outlet 1, and calcium chloride solution is added into the reactor B, the amount of addition of the calcium chloride solution is controlled through the liquid flowmeter, the mass concentration of the calcium contained in the calcium chloride is about three times of the mass concentration of phosphorous in the effluent of the reactor A. The slow stirring of the stirrer only plays a role in stirring, and under the slow mixing of the stirrer, the calcium reacts with the phosphorous to form hydroxyapatite precipitates to sink into the lower part of the reactor B.

In step 5, the hydroxyapatite precipitates sunk to the lower part of the reactor B is subjected to sludge discharge at the lower part of the reactor B to achieve the phosphorous recovery of the urine. The obtained hydroxyapatite precipitates may serve as a raw material for producing phosphorous fertilizer, and the removal rate of the phosphorous in the reactor is 80% or more, the supernatant after phosphorous removal treatment in the reactor B enters the water production tank through the water outlet 2 and is used for flushing the source separation toilet, thus achieving the recycling of the urine.

As above, although the embodiments of the present disclosure are described in details, those skilled in the art would readily appreciate that many modifications are possible in the embodiments without materially departing from the novel teachings and advantages of the present disclosure. Accordingly, such modifications are intended to be included within the scope of protection of the present disclosure.

The existing train toilet in China is only used as a sewage receiving unit and does not have any function of sewage in-situ treatment and resource utilization. At present, the wastewater treatment of the toilet is mainly as follows: unified sewage discharge, direct discharge of municipal pipe network or sewage discharge, centralized treatment at station sewage treatment plants, which belongs to a typical high-energy-consuming pollutant terminal treatment mode. Due to large quality and quantity fluctuation and high pollutant concentration of the sewage in the train toilet, it is difficult to treat by using the existing treatment method, and the problems of pollutant residue and biological safety cannot be effectively solved. In addition, in the traditional drainage system, fecal sewage is mixed with other sewage, resulting in more water consumption, and pathogens and micro-pollutants in the water have the possibility of diffusion. Therefore, separating and collecting urine from the source can greatly reduce the pollution load in sewage, reduce the difficulty of terminal sewage treatment, and reduce the risk of water pollution caused by pollutant discharge. In addition, in the present disclosure, the source-separated fresh urine is treated in situ to remove carbon and nitrogen from the urine and recover phosphorus, and the treated water is used for flushing toilets, which not only recycles the urine, but also reduces the use of tap water for flushing the toilet in the train.

What is claimed is:

1. A functionally zoned membrane aerated biofilm reactor (MABR) for in-situ nitrogen and carbon removal, wherein the functionally zoned membrane aerated biofilm reactor comprises a vertically arranged tank body, the tank body comprises an upper part and a lower part therein; the upper part is provided with a MABR membrane module, and the lower part is a space communicating with the upper part; the tank body is provided with a first water inlet, a first water outlet and a return port; the first water inlet is provided at the bottom of the functionally zoned membrane aerated biofilm reactor, the first water outlet is provided at the upper part of the functionally zoned membrane aerated biofilm reactor; the return port is also provided on the functionally zoned membrane aerated biofilm reactor and is connected to the first water inlet through a return pump; and an aerator device for supplying oxygen to the MABR membrane module is provided at the top of the functionally zoned membrane aerated biofilm reactor;

the first water outlet is arranged above the MABR membrane module;
a second liquid flowmeter is further arranged upstream the return pump;
anaerobic bacteria are provided in the lower part of the functionally zoned membrane aerated biofilm reactor, and nitrococcus-anammox double-layer microbes are attached to the MVABR membrane module at the upper part of the functionally zoned membrane aerated biofilm reactor; and
denitrifying bacteria are further provided in the lower part of the functionally zoned membrane aerated bio film reactor.

2. The membrane aerated biofilm reactor according to claim 1, wherein a volume of the upper part and the lower part of the functionally zoned membrane aerated biofilm reactor is 30-50 L and 20-30 L, respectively.

3. A method for efficient nitrogen and carbon removal of source-separated urine by the functionally zoned membrane aerated biofilm reactor according to claim 1, comprising the following steps: SO 1): injecting source-separated urine into the lower part of the functionally zoned membrane aerated biofilm reactor through a first water inlet, and adjusting, by an aerator device, a dissolved oxygen concentration at the lower part of the functionally zoned membrane aerated biofilm reactor to be zero, thus hydrolyzing urea into ammonia nitrogen under the action of anaerobic bacteria; S02): after a hydrolysis rate of the urea in the lower part reaches 85% or more in step SO 1), continuing to inject the urine to be treated through the first water inlet at the bottom, enabling part of the urine to enter the MABR membrane module at the upper part, controlling the dissolved oxygen concentration of the MABR membrane module at the upper part to be 0.3 mg/L to 0.5 mg/L, and removing nitrogen under the action of microbes on the surface of the MABR membrane module at the upper part, thus generating nitrogen and nitrate nitrogen; and S03): returning liquid containing nitrate nitrogen after treatment in the upper part to the lower part of the membrane aerated biofilm reactor by a return pump, and reducing the nitrate nitrogen to nitrogen by denitrification at the lower part.

4. A system for efficient nitrogen and carbon removal and phosphorus recovery of source-separated fresh urine, comprising the functionally zoned membrane aerated biofilm reactor of claim 1;

the system further comprises a source separation toilet, a source-separated urine storage tank, a phosphorous recovery reactor, a calcium salt solution tank, a water production tank, and a control system.

5. The system for efficient nitrogen and carbon removal and phosphorus recovery of source-separated fresh urine according to claim 4, wherein the source separation toilet is connected to the source-separated urine storage tank by a pipeline, the source-separated urine storage tank is connected to the functionally zoned membrane aerated biofilm reactor by a pipeline, the functionally zoned membrane aerated biofilm reactor is connected to the phosphorous recovery reactor by a pipeline, the phosphorous recovery reactor is connected to the water production tank by a pipeline, the phosphorous recovery reactor is connected to the calcium salt solution tank by a pipeline, and the water production tank is connected to the source separation toilet by a pipeline; and at least one of a valve, a water pump, and a liquid flowmeter is configured between every two connected components;

the flow direction, velocity and aeration amount of the liquid in the pipeline are controlled by the control system.

6. The system for efficient nitrogen and carbon removal and phosphorus recovery of source-separated fresh urine according to claim 4, wherein the phosphorous recovery reactor is provided with a second water inlet, a second outlet, a calcium phosphate collecting port, a stirring device, and a calcium salt adding port; the calcium phosphate collecting port is provided at the bottom of the phosphorous recovery reactor, the second water inlet and the second water outlet are provided on a sidewall of the phosphorous recovery reactor, and a position of the second water inlet is lower than that of the second water outlet.

7. The system for efficient nitrogen and carbon removal and phosphorus recovery of source-separated fresh urine according to claim 4, wherein the calcium salt adding port is provided at the top of the phosphorous recovery reactor;

the calcium salt solution tank is used to control calcium salt solution to be added into the phosphorous recovery reactor through a calcium adding pump and a liquid flowmeter;

the liquid part obtained after the separation of the source separation toilet is flows into the source-separated urine storage tank by a pipeline, the water production tank is connected to flush water tank of the source separation toilet by the pipeline.

8. The method according to claim 3, wherein a volume of the upper part and the lower part of the functionally zoned membrane aerated biofilm reactor is 30-50 L and 20-30 L, respectively.

* * * * *